US007766519B2

(12) United States Patent
Wang

(10) Patent No.: US 7,766,519 B2
(45) Date of Patent: Aug. 3, 2010

(54) ILLUMINATION DEVICES WITH COOLING FANS AND COOLING METHODS THEREOF

(75) Inventor: Bang-Ji Wang, Taipei (TW)

(73) Assignee: Qisda Corporation, Taoyuan County (TW)

( * ) Notice: Subject to any disclaimer, the term of this patent is extended or adjusted under 35 U.S.C. 154(b) by 529 days.

(21) Appl. No.: 11/778,562

(22) Filed: Jul. 16, 2007

(65) Prior Publication Data

US 2008/0030141 A1 Feb. 7, 2008

(30) Foreign Application Priority Data

Aug. 4, 2006 (TW) .............................. 95128604 A

(51) Int. Cl.
*B60Q 1/06* (2006.01)

(52) U.S. Cl. ....................................... 362/373; 362/580

(58) Field of Classification Search ................. 362/373, 362/547, 580; 445/3, 39, 54
See application file for complete search history.

(56) References Cited

U.S. PATENT DOCUMENTS 5,758,955 A * 6/1998 Belliveau .................... 362/293
6,616,304 B2 9/2003 Li
7,344,279 B2 * 3/2008 Mueller et al. .............. 362/294
7,380,965 B2 * 6/2008 Nakashita ................... 362/373
2004/0208009 A1 * 10/2004 Mardon et al. .............. 362/373

FOREIGN PATENT DOCUMENTS

CN 1474062 A 2/2004
JP 4342948 A 11/1992

* cited by examiner

*Primary Examiner*—Thuy Vinh Tran

(57) ABSTRACT

Methods for cooling an illumination device are disclosed. The illumination device comprises a cathode, an anode and a cooling fan. A variation of a lamp voltage of the illumination device is first detected. The lamp voltage is the voltage difference between the cathode and the anode, and the variation of the lamp voltage is derived from comparing the lamp voltage which is detected with the lamp voltage at the first time the illumination device is used. A rotational rate of the cooling fan is then adjusted according to the variation of the lamp voltage.

17 Claims, 4 Drawing Sheets

20

```
If ((Lamp Voltage-Lamp Voltage@Lamp Hour=0)<=15 Volt) and (Lamp Hour<500)
    Blower rpm=4000;
elseif ((Lamp Voltage-Lamp Voltage@Lamp Hour=0)<=35 Volt) and (Lamp Hour<1000)
    Blower rpm=4100;
elseif ((Lamp Voltage-Lamp Voltage@Lamp Hour=0)<=45 Volt) and (Lamp Hour<1500)
    Blower rpm=4200;
elseif ((Lamp Voltage-Lamp Voltage@Lamp Hour=0)>45 Volt) and (Lamp Hour>1500)
    Blower rpm=4300;
    Else Blower rpm=4000
```

FIG. 3

ILLUMINATION DEVICES WITH COOLING FANS AND COOLING METHODS THEREOF

BACKGROUND OF THE INVENTION

1. Field of the Invention

The invention relates to a cooling method for an illumination device, and more particularly to a method for adjusting the rotational rate of a cooling fan of an illumination device.

2. Description of the Related Art

Illumination devices are typically employed in a variety of apparatuses, such as projection devices, rear-projection televisions, household illumination devices, commercial neon illumination devices, and high altitude illumination devices. Because illumination devices become hot when used, heat-dissipating devices, such as cooling fans, are typically required for cooling.

Current fan control methods hold the fan at a fixed rotational rate. In some methods, several references, such as pulses, are collected from the fan to maintain a stable rate of rotation. In some methods, the cooling fans are set to operate at a fixed rate of rotation for cooling illumination devices with power greater than a specific wattage, such as lamps with power greater than 100 watts, are used.

An arc gap between a cathode and an anode of an illumination device increases with time used. Lamp voltage is generated between the cathode and the anode in direct proportion to the arc gap. Thus, lamp voltage rises gradually as increased time of use used. Because the lamp voltage rises, the temperature of the illumination device increases slightly, and the illumination device does not remain at the same temperature from the initial usage stage to the later usage stage. In other words, an illumination device in use for a long time is hotter and less bright.

Referring to FIG. 1, a lamp is illustrated as an example of an illumination device. A lamp 10 comprises a cathode 12, an anode 14, and a cooling fan 16. An arc is formed to emit light by the discharge between the cathode 12 and the anode 14, and an arc gap 18 between the cathode 12 and the anode 14 increases with increased usage time. The lamp voltage which is the voltage difference between the cathode 12 and the anode 14 gradually increases with the increased usage time of the lamp 10. The greater the lamp voltage becomes, the hotter the lamp 10 will be.

Current control methods, however, do not consider lamp voltage or temperature variation in an illumination device. Adjusting the rotational rate of a cooling fan based on the variation of the lamp voltage in an illumination device is a more efficient and necessary method to cooling the illumination device. Thus, the optimum working temperature of the illumination device will be maintained.

BRIEF SUMMARY OF THE INVENTION

A cooling method for an illumination device is provided. In an exemplary embodiment of a cooling method for an illumination device, a variation of a lamp voltage in an illumination device comprising a cathode, an anode, and a cooling fan, is first detected. The lamp voltage is the voltage difference between the cathode and the anode, and the variation of the lamp voltage is derived from comparing the lamp voltage which is detected with the lamp voltage at the first time the illumination device is used. The rotational rate of the cooling fan is then adjusted according to the variation of the lamp voltage.

An Illumination device is provided. An exemplary embodiment of an illumination device comprises a cathode, an anode, a cooling fan, and an adjustment system comprising a detection module and an adjustment module.

The detection module detects a variation of the lamp voltage. The lamp voltage is the voltage difference between the cathode and anode. The variation of the lamp voltage is derived from comparing the lamp voltage which is detected with the lamp voltage at the first time the illumination device is used.

The adjustment module is coupled to the detection module and the cooling fan. The rotational rate of the cooling fan is adjusted by the adjustment module according to the variation of the lamp voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3 is a flow chart of an exemplary embodiment of a method for cooling an illumination device.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
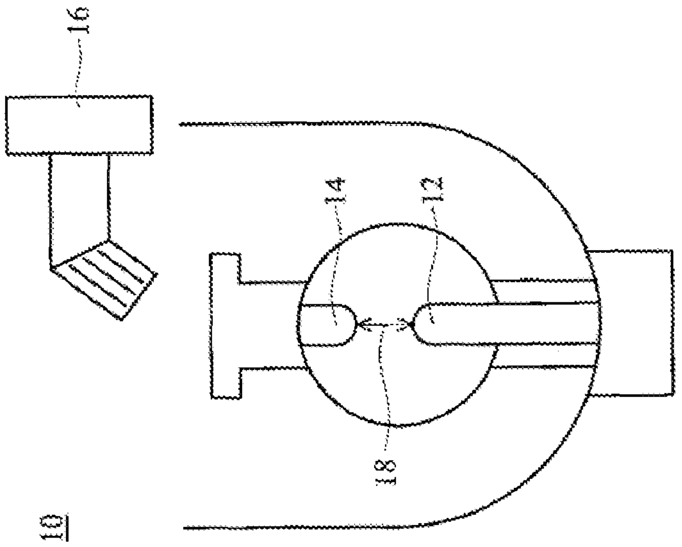
FIG. 1 Prior Art
FIG. 1 shows a conventional illumination device.
Figure 2:
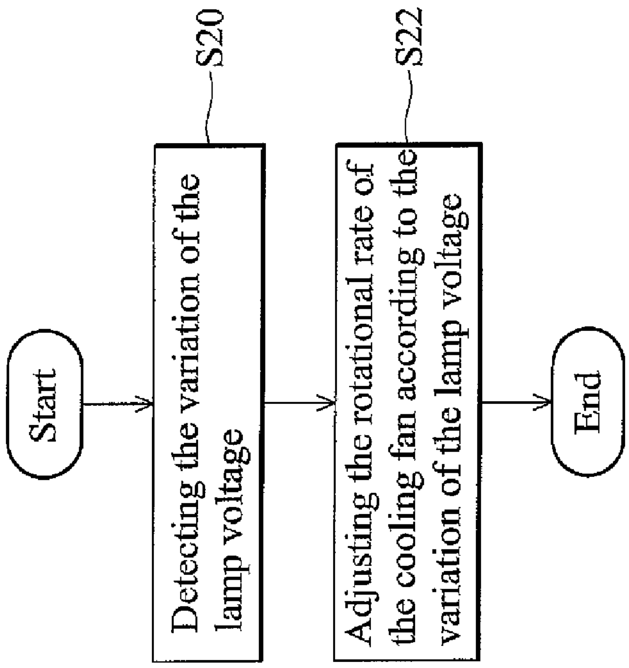
FIG. 2 is a flow chart of an exemplary embodiment of a method for cooling an illumination device.

A cooling method for an illumination device is provided. FIG. 2 is a flow chart illustrating an exemplary embodiment of a cooling for an illumination device. The illumination device comprises a cathode, an anode, and a cooling fan. The variation of the lamp voltage of the illumination device is first detected. The lamp voltage is the voltage difference between the cathode and the anode. The variation of the lamp voltage is derived from comparing the lamp voltage which is detected with the lamp voltage at the first time the illumination device is used. The rotational rate of the cooling fan is then adjusted according to the variation of the lamp voltage. For example, when the variation of the lamp voltage is less than a first predetermined variation, the rotational rate of the cooling fan is set to a first predetermined rotation rate. When the variation of the lamp voltage is greater than the first predetermined variation and less than a second predetermined variation, the rotational rate of the cooling fan is set to a second predetermined rotation rate. When the variation of the lamp voltage is greater than the second predetermined variation, the rotational rate of the cooling fan is set to a third predetermined rotation rate.

Therefore, when the variation of the lamp voltage reaches a threshold value, the rotational rate of the cooling fan increases to a predetermined value to regulate the temperature of the illumination device. With prolonged use, the temperature remains balanced. The difference in value between the first and second predetermined variations is the same as or different than that between the second and third predetermined variations. The classification of the variation of the lamp voltage is not limited to the three described levels. On the contrary, the levels of the variation can be increased or decreased based on actual system requirements.

In some embodiments, the used hour number of the lamp is also considered to cooling the illumination device. For example, when the used hour number of the lamp is less than a first predetermined number of hours, the rotational rate of the cooling fan is set to a first predetermined rotation rate. When the used hour number of the lamp is greater than the first predetermined number of hours and less than a second predetermined number of hours, the rotational rate of the cooling fan is set to a second predetermined rotation rate. When the used hour number of the lamp is greater than the second predetermined number of hours, the rotational rate of the cooling fan is set to a third predetermined rotation rate.

The difference in value between the first predetermined number of hours and the second predetermined number of hours is the same as or different than that between the second predetermined number of hours and the third predetermined number of hours. The classification of the used hour number of the lamp is not limited to three. On the contrary, the levels of the used hour number of the lamp can be increased or decreased, based on actual system requirements. Moreover, the rotational rate of the cooling fan can be adjusted according to the variation of the lamp voltage only, or with the used hour number of the lamp also.

FIG. 3 is a flow chart illustrating an exemplary embodiment of a cooling method for an illumination device with a cooling fan. Both the variation the lamp voltage and the used hour number of the lamp serve as adjustment references at the same time. When the variation of the lamp voltage, which is derived from comparing the lamp voltage that is detected with the lamp voltage at the first time the illumination device is used (Lamp Voltage-Lamp Voltage@Lamp Hour=0), is less than 15 volts and the used hour number of the lamp is less than 500 hours, the rotational rate of the cooling fan is set to 4000 rpm (revolution per minute). When the variation of lamp voltage is greater than 15 volts and less than 35 volts, and the used hour number of the lamp is greater than 500 hours and less than 1000 hours, the rotational rate of the cooling fan is increased to 4100 rpm. When the variation of lamp voltage is greater than 35 volts and less than 45 volts, and the used hour number of the lamp is greater than 1000 hours and less than 1500 hours, the rotational rate of the cooling fan is increased to 4200 rpm. When the variation of the lamp voltage is greater 45 volts, and the used hour number of the lamp is greater than 1500 hours, the rotational rate of the cooling fan is increased to 4300 rpm.

Figure 4:
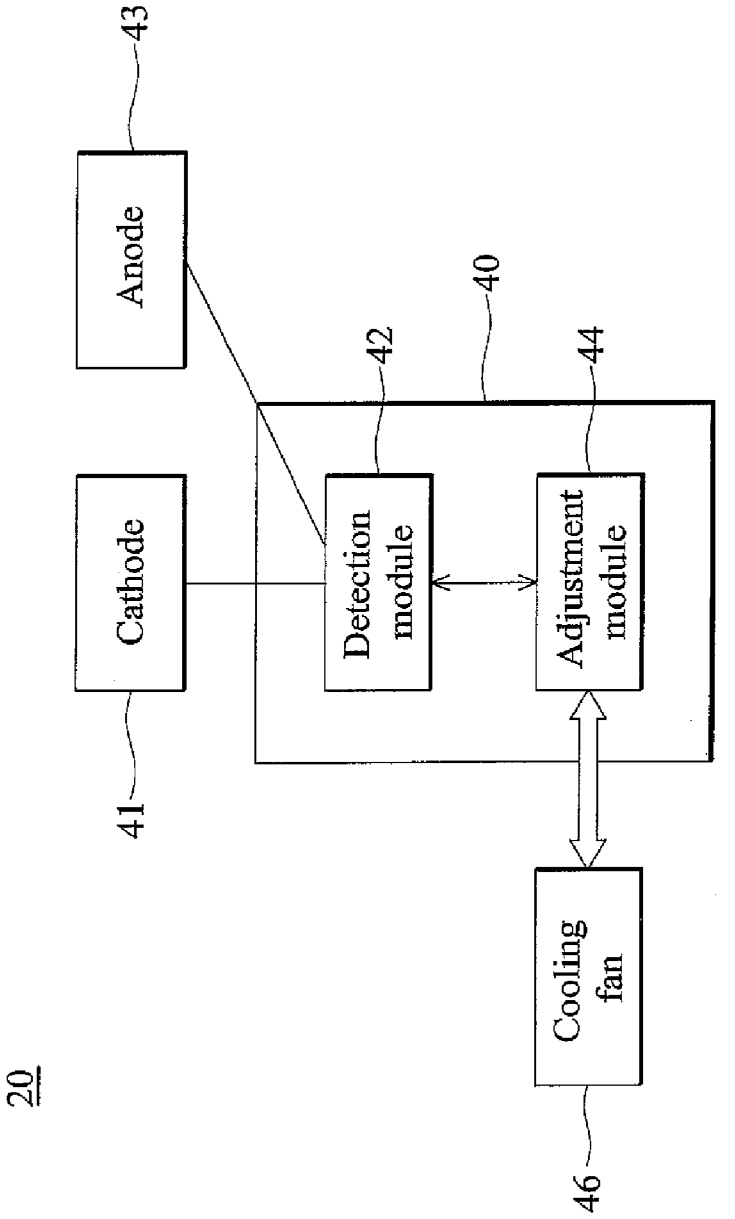
FIG. 4 shows an exemplary embodiment of an illumination device.

FIG. 4 shows an exemplary embodiment of an illumination device. An illumination device 20 comprises a cathode 41, an anode 43, a cooling fan 46 disposed near the cathode 41 and the anode 43, and an adjustment system 40 comprising a detection module 42 and an adjustment module 44.

The cathode 41 is opposite the anode 43, and the lamp voltage between the cathode 41 and the anode 43 generates high-voltage discharge to emit a light beam. The lamp voltage is the voltage difference between the cathode 41 and the anode 43.

The detection module 42 is coupled to the cathode 41 and the anode 43. The detection module 42 detects the variation of the lamp voltage and the used hour number of the lamp in the illumination device 20. By comparing the lamp voltage which is detected with the lamp voltage at the first time the illumination device is used, the variation of the lamp voltage is derived. The adjustment module 44 is coupled to the detection module 42 and the cooling fan 46. The adjustment module 44 may adjust the rotational rate of the cooling fan 46 according to the variation of the lamp voltage only, or with the used hour number of the lamp also. The detail of adjusting the rotational rate of the cooling fan 46 by the adjustment module 44 is the same with the description in the above embodiment. The adjustment module 44 including the detection module 42 and the adjustment module 44 may be implemented by a chip.

As described, in some embodiments of an illumination device with a cooling fan and a cooling method thereof, the variation of the lamp voltage of the illumination device is continuously detected to serve as a basis for adjusting the rotational rate of the cooling fan. In some embodiments, other references can be also considered for adjusting the rotational rate of the cooling fan, such as the used hour number of the lamp in the illumination device.

Methods and systems of the present invention, or certain aspects or portions of embodiments thereof, may take the form of program code (i.e., instructions) embodied in media, such as floppy diskettes, CD-ROMS, hard drives, firmware, or any other storage medium, wherein. When the program code is loaded into and executed by a machine, such as a computer, the machine becomes an apparatus for practicing and embodiment of the invention. The method and system of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cooling method for an illumination device comprising a cathode, an anode, and a cooling fan, comprising:

detecting a variation of a lamp voltage of the illumination device, wherein the lamp voltage is a voltage difference between the cathode and the anode, and the variation is derived from comparing the lamp voltage which is detected with the lamp voltage at the first time the illumination device is used;

adjusting a rotational rate of the cooling fan according to the variation of the lamp voltage.

2. The cooling method as claimed in claim 1, wherein when the variation of the lamp voltage is less than a first predetermined variation, the rotational rate of the cooling fan is set to a first predetermined rotational rate.

3. The cooling method as claimed in claim 2, wherein when the variation of the lamp voltage is greater than the first predetermined variation and less than a second predetermined variation, the rotational rate of the cooling fan is set to a second predetermined rotation rate.

4. The cooling method as claimed in claim 3, wherein when the variation of the lamp voltage is greater than the second predetermined variation, the rotational rate of the cooling fan is set to a third predetermined rotation rate.

5. The cooling method as claimed in claim 1, wherein the rotational rate of the cooling fan is adjusted further according to an used hour number of the lamp in the illumination device.

6. The cooling method as claimed in claim 5, wherein when the used hour number of the lamp is less than a first predetermined number of hours, the rotational rate of the cooling fan is set to a first predetermined rotational rate.

7. The cooling method as claimed in claim 6, wherein when the used hour number of the lamp is greater than the first predetermined number of hours and less than a second predetermined number of hours, the rotational rate of the cooling fan is set to a second predetermined rotation rate.

8. The cooling method as claimed in claim 7, wherein when the used hour number of the lamp is greater than the second predetermined number of hours, the rotational rate of the cooling fan is set to a third predetermined rotational rate.

9. An illumination device comprising:

a cathode;

an anode opposite to the anode, wherein a lamp voltage between the cathode and the anode is a voltage difference between the cathode and the anode;

a cooling fan disposed near the cathode and the anode;

a detection module coupled to the cathode and the anode and detecting a variation of the lamp voltage by comparing the lamp voltage which is detected with the lamp voltage at the first time the illumination device is used; and an adjustment module coupled to the detection module and the cooling fan and adjusting a rotational rate of the cooling fan according to the variation of the lamp voltage.

10. The illumination device as claimed in claim 9, wherein when the variation of the lamp voltage is less than a first predetermined variation, the adjustment module sets the rotational rate of the cooling fan to a first predetermined rotational rate.

11. The illumination device as claimed in claim 10, wherein when the variation of the lamp voltage is greater than the first predetermined variation and less than a second predetermined variation, the adjustment module sets the rotational rate of the cooling fan to a second predetermined rotational rate.

12. The illumination device as claimed in claim 11, wherein when the variation of the lamp voltage is greater than the second predetermined variation, the adjustment module sets the rotational rate of the cooling fan a third predetermined rotational rate.

13. The illumination device as claimed in claim 9, wherein the detection module further detects an used hour number of the lamp in the illumination device, and the adjustment module adjusts the rotational rate of the cooling fan further according to the used hour number of the lamp.

14. The illumination device as claimed in claim 13, wherein when the used hour number of the lamp is less than a first predetermined number of hours, the adjustment module sets the rotational rate of the cooling fan to a first predetermined rotational rate.

15. The illumination device as claimed in claim 14, wherein when the used hour number of the lamp is greater than the first predetermined number of hours and less than a second predetermined number of hours, the adjustment module sets the rotational rate of the cooling fan to a second predetermined rotational rate.

16. The illumination device as claimed in claim 15, wherein when the used hour number of the lamp hours is greater than the second predetermined number of hours, the adjustment module sets the rotational rate of the cooling fan to a third predetermined rotational rate.

17. The illumination device as claimed in claim 9, wherein the detection module and the adjustment module are implemented by a chip.

* * * * *